(12) United States Patent
Hebert

(10) Patent No.: US 6,726,151 B2
(45) Date of Patent: *Apr. 27, 2004

(54) MINIATURE SPACECRAFT

(76) Inventor: Barry Francis Hebert, 1230 Horn Ave., West Hollywood, CA (US) 90069

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/575,487

(22) Filed: May 19, 2000

(65) Prior Publication Data

US 2003/0150958 A1 Aug. 14, 2003

Related U.S. Application Data

(63) Continuation of application No. 09/371,784, filed on Aug. 10, 1999, now Pat. No. 6,131,857.
(60) Provisional application No. 60/106,340, filed on Oct. 30, 1998.

(51) Int. Cl.⁷ ................................................ B64G 1/22
(52) U.S. Cl. .................................................. 244/158 R
(58) Field of Search .......................... 244/158 R, 135 R

(56) References Cited

U.S. PATENT DOCUMENTS

| | | | |
|---|---|---|---|
| 2,543,709 A | | 2/1951 | Saulnier |
| 3,153,235 A | | 10/1964 | Chatelain |
| 3,168,263 A | | 2/1965 | Kamm |
| 3,258,225 A | | 6/1966 | Esch et al. |
| 3,596,853 A | | 8/1971 | Anderson et al. |
| 3,709,447 A | | 1/1973 | Devlin |
| 3,979,005 A | | 9/1976 | Robinson et al. |
| 5,271,582 A | | 12/1993 | Perkins et al. |
| 5,314,146 A | | 5/1994 | Chicoine et al. |
| 5,628,476 A | * | 5/1997 | Soranno et al. ......... 244/158 R |
| 5,755,406 A | | 5/1998 | Aston et al. |
| 5,848,767 A | | 12/1998 | Cappa et al. |
| 6,131,857 A | * | 10/2000 | Hebert .................... 244/158 R |
| 6,206,327 B1 | * | 3/2001 | Benedetti et al. ....... 244/158 R |

* cited by examiner

Primary Examiner—Michael J. Carone
Assistant Examiner—Tim D. Collins

(57) ABSTRACT

A miniature spacecraft is constructed using modular features so as to provide a wide range of possible sizes with a choice of physical attributes. Radially directed bays are arranged around a central cylindrical element which may be used for storing a propulsion tank or canister. Octagonal or other configurations provide rigidity and strength through the use of triangular planetary cylinders which form outwardly facing bays for storage.

22 Claims, 1 Drawing Sheet

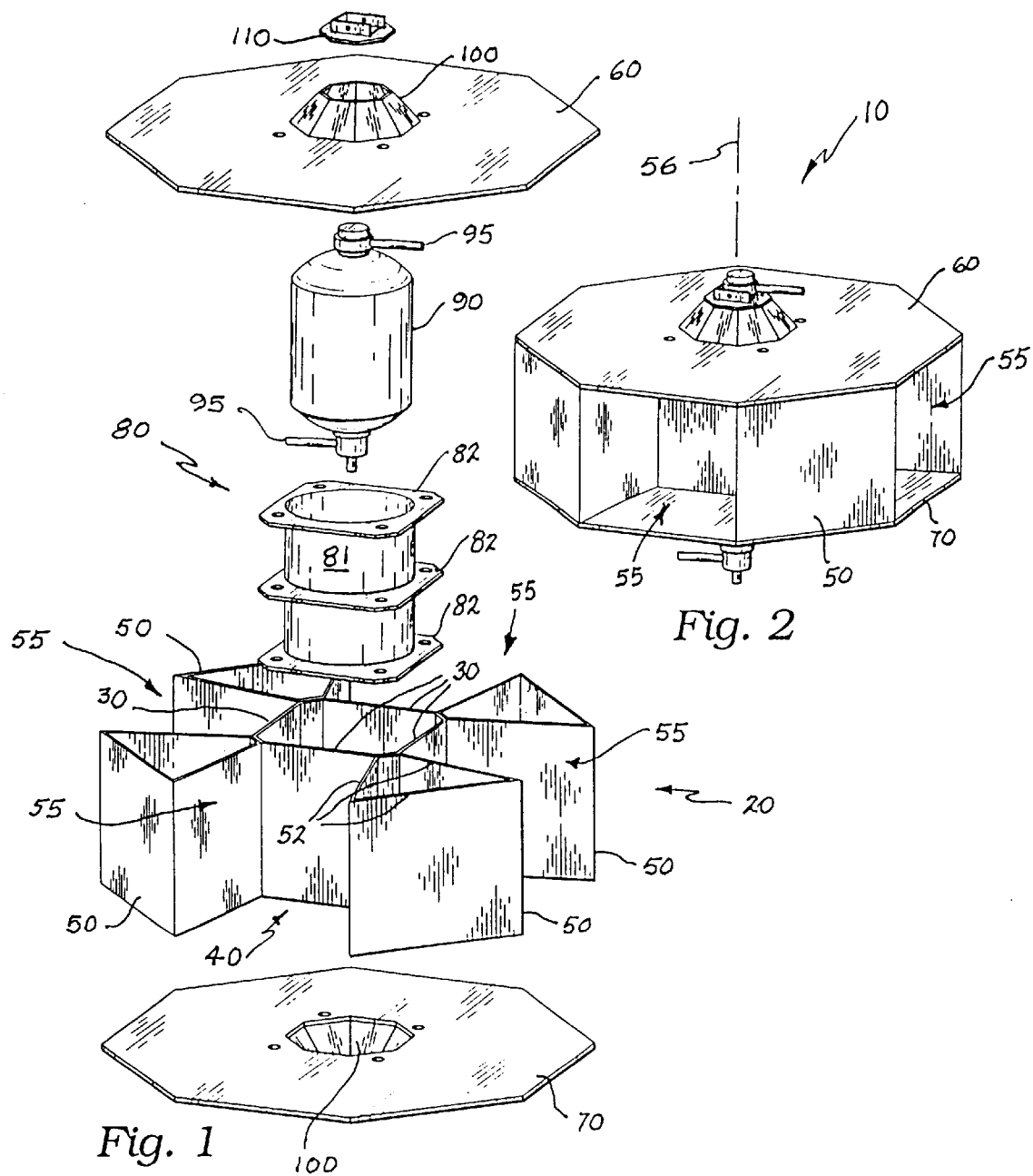

MINIATURE SPACECRAFT

The present application is a continuation of application Ser. No. 09/371,784 now U.S. Pat. No. 6,131,857, filed Aug. 10, 1999.

This application claims the filing date of a previously filed provisional patent application having Ser. No. 60/106,340 and an assigned filing date of Oct. 30, 1998 as well as Disclosure Documents having Ser. Nos. 442,563, 448.685, 448,677 and 448,678 having filing dates of Jul. 23, 1998, Dec. 15, 1998, Dec. 15, 1998 and Dec. 15, 1998 respectively, which applications and disclosures containing subject matter substantially the same as that described and claimed in the present application.

BACKGROUND OF THE INVENTION

1. Field of the Invention

This invention relates generally to aircraft and particularly to craft designed for operation in a low gravity environment such as space craft, and more particularly to a miniature space craft of specific modular construction adapted for structural expansion for a variety of applications.

2. Description of Related Art

The following art defines the present state of this field:

Devlin, U.S. Pat. No. 3,709,447 describes a satellite apparatus whereby a plurality of experiments may be monitored in a single satellite for a plurality of different organizations. The satellite has modular casings for placement on a frame and adapted to place experimental components therein with instrumentation facing a centrally located scanner which transmits data on the experiments to a receiving station.

Perkins et al., U.S. Pat. No. 5,271,582 describes multiple subsidiary small payloads connected to standard mechanical and electrical interfaces provided by an expendable or recoverable modular mother satellite bus (MMSB) and launched into space as an assembly acting as a common carrier providing low unit launch costs for the attached subsidiary payloads and also providing a variety of electrical, pointing, and thermal control services for these payloads after reaching orbit. These services include but are not necessarily limited to controlled separation of free-flying satellites or re-entry vehicles, regulated electric power at a variety of voltages, telemetry, computer control, payload control via time delayed pre-programmed instructions, optional real-time payload control via direct radio communication or transmission through geostationary or other communication satellite links, time-driven or event-driven control logic, mass data memory, encryption and decryption of data and commands, payload pointing augmented heat rejection, and interconnection between subsidiary attached payloads through the data bus.

Anderson, U.S. Pat. No. 3,596,853 describes a space capsule including heat source devices individually recoverable in which each heat source device includes a combined pyramidal-type reentry body and heat reflector and a radioisotopic heat source disposed in a hollow or concave portion of the body.

Cappa et al., U.S. Pat. No. 5,848,767 describes a single piece frame for a spacecraft, the frame manufactured as fiber composite sheets overlay a core. The core is preferably made of aluminum and formed with a honeycomb cross-section. The frame provides a mounting structure to which payload, spacecraft equipment, and boost vehicle are attached. The frame can be reinforced locally by varying the core density or the wall thickness so as to resist concentrated or localized loads. The orientation of the fiber in the composite sheets may also be varied so as to so as to strengthen the frame in a desired location.

Esch et al., U.S. Pat. No. 3,258,225 describes a satellite structure comprising, a frame comprising a plurality of frame sections, side panels carried by the frame and supported in said frame sections, a top panel closing the upper end of the frame, a bottom panel closing the lower end of the frame and having a central opening, a metallic base plate closing the opening, and satellite instrumentation supporting means mounted on the base plate and having its upper end secured to the top panel.

Chatelain, U.S. Pat. No. 3,153,235 describes a reflector antenna having a hollow, expansible polyhedral body consisting of a plurality of inwardly extending recesses.

Kamm, U.S. Pat. No. 3,168,263 describes a satellite vehicle orientation device comprising a satellite vehicle, a rigid, elongated tubular member having one end fastened to said satellite vehicle, a reel for storing said tubular member and means for deploying said tubular member.

The prior art teaches various spacecraft construction schemes. However, the prior art does not teach that a miniature spacecraft may be constructed with a central cylindrical bay having radially oriented triangular bays for forming open bay areas facing outwardly. The present invention fulfills these needs and provides further related advantages as described in the following summary.

SUMMARY OF THE INVENTION

The present invention teaches certain benefits in construction and use which give rise to the objectives described below.

The present invention provides a miniature spacecraft constructed using modular features so as to provide a wide range of possible sizes with a choice of physical attributes. Radially directed bays are arranged around a central cylindrical element which may be used for storing a propulsion tank or canister. Octagonal or other configurations provide rigidity and strength through the use of triangular planetary cylinders forming outwardly facing bays for storage.

A primary objective of the present invention is to provide a miniature spacecraft having advantages not taught by the prior art.

Another objective is to provide such a craft having octagonal symmetry for strength and adaptability.

A further objective is to provide such a craft having radial constructional features for strength.

A still further objective is to provide such a craft having triangular wall structures for rigidity.

A yet further objective is to provide such a craft having a central cylindrical bay capable of storing a payload such as a propulsion canister.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 1 is an exploded perspective view of the preferred embodiment of the present invention; and FIG. 2 is a perspective view thereof showing the invention as assembled.

DETAILED DESCRIPTION OF THE INVENTION

The above described drawing figures illustrate the invention, a miniature spacecraft apparatus 10 comprising a rigid structural and symmetrical body portion 20 including plural walls 30 arranged to form an open central cylindrical wall enclosure 40. The preferable materials used in the present invention are high strength composite sheet stock. Appended to, and extending radially outwardly from the central cylindrical wall enclosure 40 are a plurality of spaced apart planetary cylindrical wall enclosures 50 best seen in FIG. 1. The planetary cylindrical wall enclosures 50 are arranged for defining generally rectangular volumes 55 therebetween, the rectangular volumes 55 being positioned for access from at least four opposing sides of the apparatus 10 as shown in FIGS. 1 and 2. A top 60 and a bottom 70 plates are engaged with the body portion 20 and the planetary wall enclosures 50 in positions for enclosing the central cylindrical wall enclosure 40 and the planetary cylindrical wall enclosures 50. The plates 60, 70 provide partial enclosure also to the rectangular volumes 55 such that these volumes are accessible only from the apparatus' periphery as can best be seen in FIG. 2. Bonding agents are used to fasten the various elements of the invention to one another in a permanently attached fashion. A cylindrical storage pod 80 is positioned within the central cylindrical wall enclosure 40, the storage pod 80 providing a means for lateral structural reinforcement 82; the three flanges shown in FIG. 1, such that forces applied to the storage pod 80 are transferred through the lateral reinforcement means 82 to the cylindrical wall enclosure 40. A closed cylindrical storage vessel 90 is enclosed within the storage pod 80 by the top and bottom plates 60, 70 the storage vessel 90 providing a fluid valving means 95 extending outwardly from a pass-through means 100 in at least one of the plates 60, 70 as shown. The fluid valving means 95 shown is only one possible propulsion device useful in conjunction with the present space craft and is intended to show how such a means may be enabled. The capping device 110 illustrates a means for structurally supporting the valving means 95.

The planetary cylindrical wall enclosures 50 each inventively comprise a triangular arrangement of structural wall sections 52 providing a highly rigid structure. The storage pod 80 comprises a circular wall element 81 integral with the plurality of lateral reinforcement means 82 which extend radially outwardly therefrom. The top and bottom plates 60, 70 and the planetary cylindrical wall enclosures 50 are of such conformation as to establish the apparatus preferably with eight sides of equal length and arranged symmetrically about a longitudinal axis 56 of the apparatus 10. The top and bottom plates 60, 70 and the planetary cylindrical wall enclosures 50 may alternately be of such conformation as to establish the apparatus 10 with a circular exterior shape or a polygon configuration other than an octagon. Clearly, the apparatus may be constructed in alternate perspective, i.e., with a smaller or larger relative height dimension. Also, the instant basic construction lends itself to a modular adaptation, so that, for instance, two of body portion 20 may be used to erect a space craft of twice the height shown in FIG. 2. Such a craft would utilize two of storage pod 80 as well and a storage vessel 90 with approximately twice the length as the vessel shown in FIG. 1.

Because of its basic and modular construction, the spacecraft of the present invention may be used for a very wide range of applications. The volumes 55 (storage bays) may be used for equipment or general storage and the other interior spaces may be utilized for necessary equipment and systems for enabling useful spacecraft functions. In such utilization a method is herein defined for equipping the spacecraft with operational components, said method including: providing the instant spacecraft with its centrally located equipment bay surrounded by the plurality of radially oriented equipment bays, through placement, interconnection or other accommodation, both mechanical and electrical, and by any of the well known prior art interconnection means and techniques: a modular electrical power package, a modular propulsion package, a modular communications package, a modular sensory and monitoring package, a modular deployable vehicle package and a modular attitude control package, each of the foregoing in at least one of the equipment bays. It should be noted that these items are listed here for reference purposes only and do not constitute an exhaustive or comprehensive list of such items. The items are also, of any of the well known types so that further details of construction, function or interconnectivity are not herein provided. The method further provides for fastening the top and bottom plates to the body portion by a plurality of removable fasteners so as to enable-replacement of the plates with alternative spacecraft equipments such as space sails, solar panels, antennas and other related exterior spacecraft systems.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A miniature spacecraft comprising:
    a symmetrical body portion including plural walls arranged to form an open central cylindrical wall enclosure, and appended to the central cylindrical wall enclosure, and extending radially outwardly therefrom a plurality of spaced apart planetary wall enclosures each said enclosure having a generally triangular configuration;
    the planetary wall enclosures arranged for defining volumes there between;
    means for enclosing the open cylindrical wall enclosure and the volumes;
    the central cylindrical wall enclosure, the volumes and the means for enclosing adapted to permit interconnection and access to the volumes.

2. The apparatus of claim 1 wherein the means for enclosing includes a top plate and a bottom plate engaged with the body portion and the planetary wall enclosure, the top plate and bottom plate enclosing the central cylindrical wall enclosure and providing partial enclosure to the volumes.

3. The apparatus of claim 1 wherein the central cylindrical wall enclosure, the volumes and the means for enclosing are adapted for electrical interconnection of operational components.

4. The apparatus of claim 1 wherein the central cylindrical wall enclosure, the volumes and the means for enclosing are adapted for mechanical interconnection of operational components.

5. The apparatus of claim 1 wherein said means for enclosing is adapted to form a multi-level structure.

6. The apparatus of claim 1 wherein said body portion, said wall enclosures and said means for enclosing are adapted for modular construction.

7. The apparatus of claim 1 wherein the enclosures and volumes are adapted to accommodate modular equipment packages.

8. The miniature spacecraft of claim 1 wherein said means for enclosing the open cylindrical wall enclosures in the volumes includes exterior spacecraft equipment fastened to said body portion.

9. A miniature spacecraft comprising:

a symmetrical body portion including plural walls extending radially outwardly from the center to form a plurality of spaced apart walls, arranged to form an open wall enclosure;

the spaced apart walls arranged for defining volumes there between and adapted for enclosing the volumes; and the walls adapted for interconnection for providing access to the volumes.

10. The apparatus of claim 9 further including a top plate and a bottom plate engaged with the body portion, the top plate and bottom plate enclosing the wall sections, and providing partial enclosure to the volumes; and the top plate and/or bottom plate adapted for interconnection with mechanical members and for allowing access to the volumes.

11. The apparatus of claim 9 wherein the walls, top plate and/or bottom plate are adapted for electrical interconnection of operational components.

12. The apparatus of claim 9 wherein the walls, top plate and/or bottom plate are adapted for mechanical interconnection of operational components.

13. The apparatus of claim 9 wherein the walls, top plate and/or bottom plate are adapted to form a multi-level structure.

14. The apparatus of claim 9 wherein the walls, top plate and/or bottom plate are adapted for modular construction.

15. The apparatus of claim 9 wherein the enclosures and volumes are adapted to accommodate modular equipment packages.

16. A miniature spacecraft comprising:

a symmetrical body portion including plural walls arranged to form an open planetary wall enclosure defining a volume;

a top plate and a bottom plate engaged with the planetary wall enclosure and adapted to enclose the volume there between; the plural walls, the top plate and the bottom plate adapted for attachment of modular equipment packages for allowing mechanical members to be appended thereto, and for allowing access to the volumes.

17. The apparatus of claim 16 wherein the plural walls, the top plate and the bottom plate are adapted for electrical interconnection of operational components.

18. The apparatus of claim 16 wherein the plural walls, the top plate and the bottom plate are adapted for mechanical interconnection of operational components.

19. The apparatus of claim 16 wherein the top plate and bottom plate are adapted to form a multi-level structure.

20. The apparatus of claim 16 wherein the plural walls are adapted for modular construction.

21. The apparatus of claim 16 wherein the enclosures and volumes are adapted to accommodate modular equipment packages.

22. A miniature spacecraft apparatus comprising:

a rigid structural and symmetrical body portion including plural walls arranged to form an open central cylindrical wall enclosure, and appended to the central cylindrical wall enclosure, and extending radially outwardly therefrom a plurality of spaced apart planetary cylindrical wall enclosures each having a generally triangular arrangement of structural wall sections;

the planetary cylindrical wall enclosures arranged for defining generally rectangular volumes there between, the rectangular volumes being positioned for access from at least four opposing sides of the apparatus;

a top and bottom plates engaged with the body portion and the planetary wall enclosures in positions for enclosing the central cylindrical wall enclosure and the planetary cylindrical wall enclosures, the plates providing partial enclosure also to the rectangular volumes;

a cylindrical storage pod positioned within the central cylindrical wall enclosure, the storage pod providing a means for lateral structural reinforcement such that forces applied to the storage pod are transferred through the lateral reinforcement means to the cylindrical wall enclosure.

* * * * *